US008271776B2

(12) United States Patent
Revel et al.

(10) Patent No.: US 8,271,776 B2
(45) Date of Patent: Sep. 18, 2012

(54) MOBILE PRINTING

(75) Inventors: Daniel Revel, Portland, OR (US);
Jeremy Bunn, Kelso, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2784 days.

(21) Appl. No.: 09/970,496

(22) Filed: Oct. 3, 2001

(65) Prior Publication Data

US 2003/0063749 A1    Apr. 3, 2003

(51) Int. Cl.
*H04L 9/00* (2006.01)
(52) U.S. Cl. .................................. 713/153; 380/277
(58) Field of Classification Search .................. 380/280, 380/277; 705/64, 408; 713/201, 153
See application file for complete search history.

(56) References Cited

U.S. PATENT DOCUMENTS

| | | | | |
|---|---|---|---|---|
| 4,645,873 A * | 2/1987 | Chomet | | 379/93.12 |
| 4,839,829 A * | 6/1989 | Freedman | | 715/751 |
| 5,509,074 A * | 4/1996 | Choudhury et al. | | 713/176 |
| 5,633,932 A * | 5/1997 | Davis et al. | | 713/176 |
| 5,799,219 A * | 8/1998 | Moghadam et al. | | 396/319 |
| 5,864,667 A * | 1/1999 | Barkan | | 726/10 |
| 5,892,900 A * | 4/1999 | Ginter et al. | | 726/26 |
| 5,897,260 A * | 4/1999 | Zingher | | 400/719 |
| 5,956,406 A * | 9/1999 | Maldy | | 380/30 |
| 6,314,521 B1 * | 11/2001 | Debry | | 726/10 |
| 6,378,070 B1 * | 4/2002 | Chan et al. | | 713/155 |
| 6,397,261 B1 * | 5/2002 | Eldridge et al. | | 713/171 |
| 6,515,988 B1 * | 2/2003 | Eldridge et al. | | 370/389 |
| 6,567,530 B1 * | 5/2003 | Keronen et al. | | 382/100 |
| 6,748,471 B1 * | 6/2004 | Keeney et al. | | 710/220 |
| 6,862,583 B1 * | 3/2005 | Mazzagatte et al. | | 705/64 |
| 2001/0047328 A1 * | 11/2001 | Triola | | 705/39 |
| 2002/0042884 A1 * | 4/2002 | Wu et al. | | 713/201 |
| 2003/0014368 A1 * | 1/2003 | Leurig et al. | | 705/64 |
| 2003/0078893 A1 * | 4/2003 | Shah et al. | | 705/60 |
| 2003/0208691 A1 * | 11/2003 | Smart et al. | | 713/201 |

FOREIGN PATENT DOCUMENTS

WO     WO 0233530 A1 *    4/2002

OTHER PUBLICATIONS

Alfred J. Menezes, Paul C. Van Oorschot and Scott A. Vanstone, "Handbook of Applied Cryptography", 1997, CRC Press LLC, pp. 15-16, 25-26, and 31.*
"Introduction to the SSL Technology", BEA Systems Inc, Tuxedo Security Pages, 2001.*
Hewlett-Packard Company Patent U.S. Appl. No. 09/897,693, filed Jun. 29, 2001, entitled "Print by Reference Service Communication Protocol an Dinterface".
Hewlett-Packard Company Patent U.S. Appl. No. 09/897,646, filed Jun. 29, 2001, entitled "Portable Wireless Device and Print Device Print by Reference Protocol".
Jon C. Graff, "Cryptography and E-Commerce", 2001, pp. 1-19.

* cited by examiner

*Primary Examiner* — Krista Zele
*Assistant Examiner* — Tamara Teslovich

(57) ABSTRACT

In a method for mobile printing, a mobile device generates a symmetrical pair of encryption keys and transmits the first encryption key and a print request to an imaging device. When the mobile device receives a request from the imaging device for the second encryption key, the mobile device transmits the second encryption key to the imaging device. The imaging device then uses the second encryption key to decrypt encrypted rendered content and prints the content.

4 Claims, 4 Drawing Sheets

MOBILE PRINTING

The present invention relates generally to mobile electronic devices and imaging devices.

Mobile electronic devices, such as mobile phones and personal digital assistants (PDA's), enjoy widespread popularity. The capabilities and functionality of these devices also continue to increase. For example, many of these devices have Internet browsing capability, which affords access to a wide variety of content and commercial service opportunities.

One drawback with mobile electronic devices is that their limited memory, display and bandwidth capabilities restrict the type and amount of content readily available to a device user. Typically, content is formatted specifically for a mobile electronic device in a manner designed to conserve device resources. In general, rich or data-intensive content is avoided in favor of more streamlined content.

In the field of printing, these resource limitations of mobile electronic devices restrict printing opportunities. In general, the traditional printing model involves pushing content resident on an electronic device, such as a PC, to an imaging device. Many imaging devices, such as personal inkjet printers, must receive the content rendered in a printer-ready format, such as PCL-3 or other page description language. Thus, the electronic device sending the print request must first convert the content into the appropriate printer-ready format.

One attempt to increase the printing capabilities of mobile electronic devices involves referencing data content resident on a remote content provider, sometimes known as "print-by-reference". In one example of the print-by-reference printing model, the user of a mobile device sends a print-by-reference print request to an imaging device. The print-by-reference request may include, for example, a uniform resource locator (URL) address for the content to be printed. The imaging device transmits the request to a remote print service. The print service retrieves the content from a content provider, renders the content into the printer-ready format appropriate for the imaging device and transmits the content to the imaging device for printing. A more detailed description of the print-by-reference printing model is available in U.S. patent applications Ser. No. 09/897,693 entitled PRINT BY REFERENCE SERVICE COMMUNICATION PROTOCOL AND INTERFACE and Ser. No. 09/897,646 entitled PORTABLE WIRELESS DEVICE AND PRINT DEVICE PRINT BY REFERENCE PROTOCOL, both applications assigned to Hewlett-Packard Co. Both of these applications are incorporated herein by reference in their entirety.

The mobility of the user of a mobile electronic device in the print-by-reference printing model presents potential challenges. For example, a mobile phone user waiting in an airport may desire to print a document using the print-by-reference model. The user may send a print-by-reference print request to an airport printer and wait for the printed output. Perhaps traffic is heavy on the print service or the airport printer has previous print requests in its queue. For these and various other reasons, there may be a delay in executing the user's print request. If during this delay the user must leave the area, perhaps to catch a flight, the print job will be printed despite the user's absence. In another situation, the user may be present when the print job is received by the imaging device, but may be unable to wait for the entire print job to be printed. Thus, it would be desirable to provide an improved printing method that addresses these types of situations and gives the user greater control over the printing process.

DETAILED DESCRIPTION OF THE PREFERRED EMBODIMENTS

Figure 1:
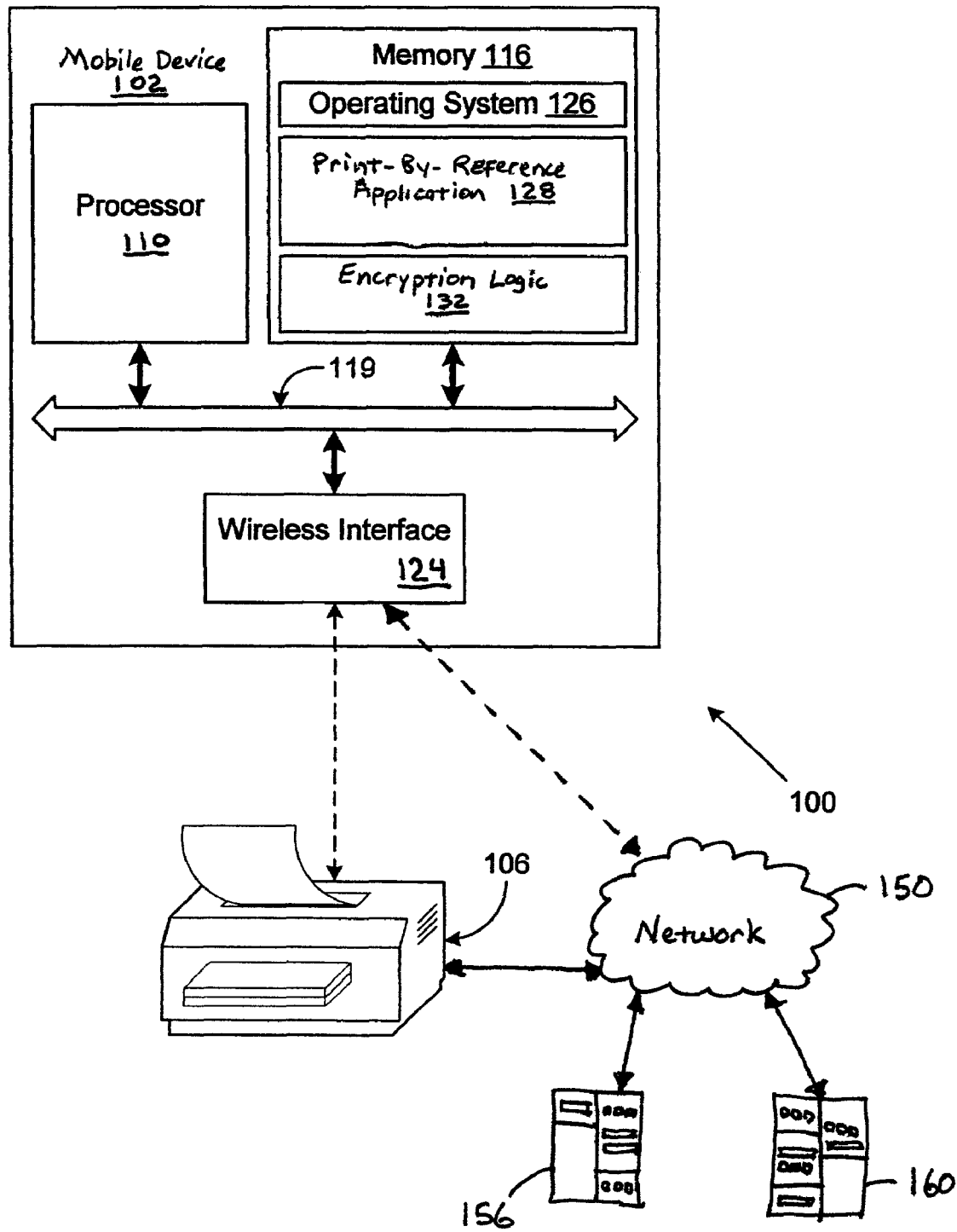
FIG. 1 is a block diagram of an exemplary wireless printing configuration that may be utilized in practicing the methods of the present invention.

FIG. 1 illustrates an embodiment of a wireless printing configuration 100 that may be utilized to practice the methods of the present invention. The wireless printing configuration 100 includes a mobile electronic device 102 and an imaging device 106. The imaging device may comprise, for example, an inkjet or electrophotographic printer, a fax machine, a multi-function printer/copier/scanner device, a copier, a video printer or the like. The mobile electronic device 102 may comprise, for example, a PDA, a mobile phone, a laptop PC, a wireless data terminal, or other such device with like capabilities. The mobile electronic device 102 includes a processor 110 and a memory 116, both of which are coupled to a local interface 119. The local interface may be, for example, a data bus with an accompanying control/address bus as is generally know by those with ordinary skill in the art.

The mobile device 102 also includes a wireless interface 124 that is coupled to the local interface 119 and facilitates wireless communication with the imaging device 106 and other wireless devices and/or networks. The wireless interface 124 may include, for example, a wireless modem and an appropriate network card that may be employed to transmit data to and receive data from the imaging device 106 and across the network 150. Any of various wireless communication protocols may be utilized by the mobile device 102, including but not limited to infrared, Bluetooth RF protocol and IEEE 802.11 RF protocol. The network 150 may comprise, for example, the Internet, wide area networks, local area networks or other similar networks.

The memory 116 stores several components that are executable by the processor 110. These components include, for example, an operating system 126, a print-by-reference application 128 and cryptography or encryption logic 132. The operating system 126 is executed to control the allocation and usage of hardware resources in the mobile device 102. For example, the operating system 126 controls the allocation and usage of the memory 116 and processing time, as well as performing other functionality as is generally know by those with ordinary skill in the art.

The print-by-reference application 128 may operate to execute a print-by-reference printing model. For example, the user of the mobile device 102 may transmit a print-by-reference print request to the imaging device 106. The print-by-reference print request may contain, for example, a URL address of the content to be printed. The imaging device 106 transmits the print request to a print service 156 over the network 150. The print service 156 retrieves the content identified in the print request, such as from a content provider 160, renders the retrieved content into a format appropriate for the imaging device 106 and transmits the rendered content to the imaging device for printing.

The encryption logic 132 is utilized to generate one or more keys that are in turn utilized to encrypt and decrypt data. It will be appreciated that the encryption logic 132 may comprise any one of various encryption technologies well known to one of ordinary skill in the art. An example of an encryption technology commonly used with the Internet is the Secure Sockets Layer (SSL) protocol.

Figure 2:
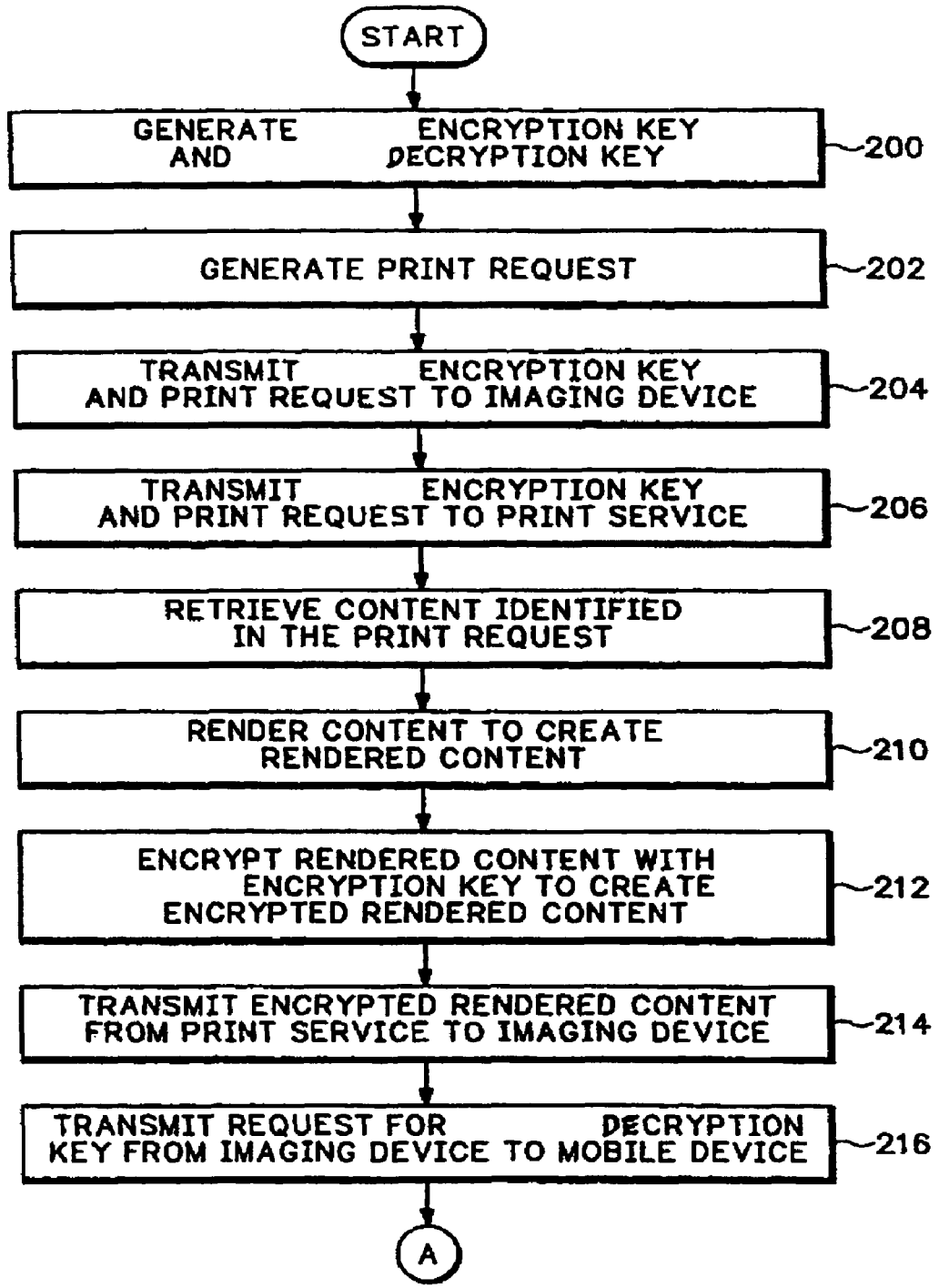
FIGS. 2 and 3 are a flow chart of the steps of one embodiment of the present invention.
Figure 3:
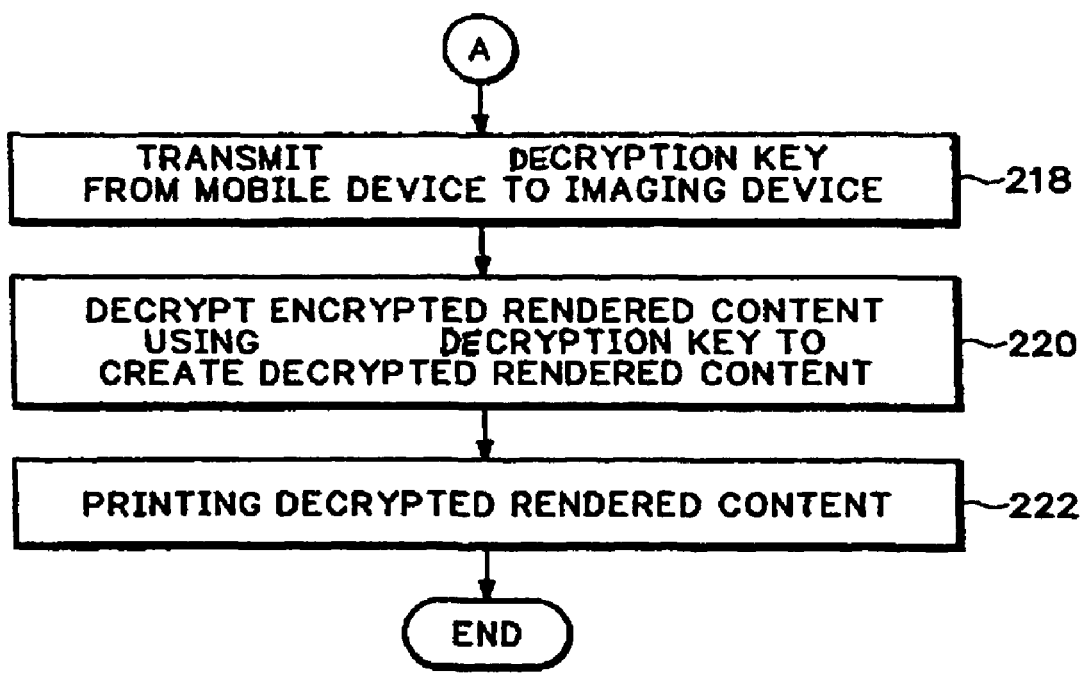

With reference now to one embodiment of the present invention, where a user of the mobile device 102 desires greater control over a print-by-reference print request, the print-by-reference application 128 may utilize the encryption logic 132 to generate enepotien keys for encrypting and decrypting the content to be printed. In one embodiment of the present invention, the encryption logic 132 operates in the context of a print-by-reference print request to generate a pair of keys. With reference now to FIGS. 2 and 3, a flow chart of one embodiment of the method of the present invention is illustrated. Beginning with block 200, the encryption logic 132 in the mobile device 102 generates a pair of keys including an encryption key and a decryption key. The encryption and decryption keys may be stored in the memory 116 on the mobile device 102. In block 202 the print-by-reference application 128 generates a print request that includes an address or location of the content to be printed, such as a URL. In block 204 the mobile device 102 transmits the encryption key and the print request to the imaging device 106.

In block 206 the imaging device 106 transmits the print request and the encryption key to a print service 156. The print service 156 retrieves the content identified in the print request, such as from a content provider 160 (block 208). It will be appreciated that the content may also reside within the print service 156. The print service 156 then renders the retrieved content into a format appropriate for the imaging device 106 (block 210); creating rendered content. In block 212 the print service 156 encrypts the rendered content with the encryption key to create encrypted rendered content. In block 214 the print service 156 then transmits the encrypted rendered content to the imaging device 106.

Upon receiving the encrypted rendered content, in block 216 the imaging device 106 transmits a request for the decryption key to the mobile device 102. Upon receiving the request from the imaging device 106, in block 218 the mobile device transmits the decryption key to the imaging device. In block 220 the imaging device 106 decrypts the encrypted rendered content with the decryption key to create decrypted rendered content. In block 222 the imaging device 106 then prints the decrypted rendered content In another embodiment of the present invention, the mobile device 102 may transmit the first encryption key, the print request, the address of an imaging device and the address of the mobile device directly to a print service 156 over the network 150. With reference to FIGS. 2 and 3, in this embodiment steps 204 and 206 would be replaced by the step of the mobile device transmitting the encryption key, the print request, the address of the imaging device 106 and the address of the mobile device directly to the print service 156. Step 214 would also include transmitting the address of the mobile device 102 from the print service 156 to the imaging device 106. The remainder of the steps 208-222 would remain the same.

Figure 4:
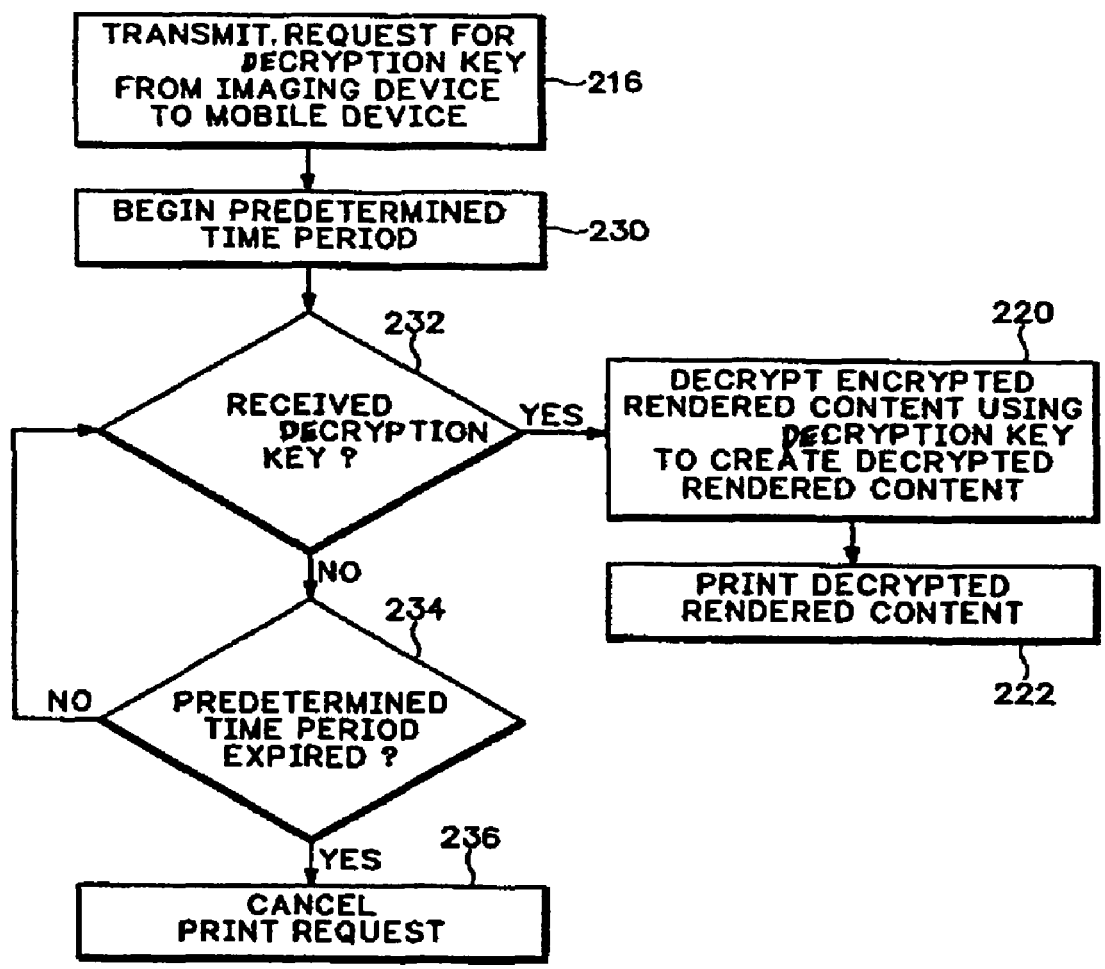
FIG. 4 is a flow chart of the steps of one aspect of an embodiment of the present invention.

To complete the print request transmitted from the mobile device 102, the imaging device 106 must receive the decryption key from the mobile device to decrypt the encrypted rendered content received from the print service 156. With reference now to FIG. 4, one embodiment that is directed to this aspect of the present invention is illustrated. Beginning with block 216, and assuming that the imaging device 106 has received the encrypted rendered content from the print service 156, the imaging device transmits a request for the decryption key to the mobile device 102. The imaging device then starts a predetermined time period (block 230) and determines whether it has received the decryption key from the mobile device 102 (block 232). If it has not received the decryption key, then it determines whether the predetermined time period has expired (block 234). If the predetermined time period has expired, then the imaging device cancels the print request (block 236). In this case, because the mobile device did not respond to the request to transmit the decryption key, this may indicate that the user of the mobile device is no longer near the imaging device 106, and perhaps has left the area. Advantageously in this situation, the print request is canceled and the content requested by the user of the mobile device is not printed. Additionally, the encrypted rendered content received by the imaging device remains encrypted, thereby protecting the content from undesired disclosure.

With continued reference to FIG. 4, block 234, if the predetermined time period has not expired, then the imaging device 106 again determines whether the decryption key has been received (block 232). If the decryption key has been received, then the imaging devices uses the decryption key to decrypt the encrypted rendered content to create decrypted rendered content (block 220). In block 222 the imaging device 106 then prints the decrypted rendered content.

With reference to FIG. 1, it will be appreciated that the memory 116 may include both volatile and nonvolatile memory and data storage components. Volatile components are those that do not retain data values upon loss of power. Nonvolatile components are those that retain data upon a loss of power. Thus, the memory 116 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory devices.

The method of printing of the present invention may be embodied in software or code executed by general purpose hardware as discussed above, or may be embodied in dedicated hardware or a combination of software/general purpose hardware and dedicated hardware. If embodied in hardware, the method of printing may be expressed or implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs)having appropriate logic gates, programmable gate arrays (PGAs), field programmable gate arrays (FPGAs), or other components. Such technologies are generally well known by those of ordinary skill in the art.

The block diagrams of FIGS. 2-4 show the architecture, functionality and operation of an implementation of the method of printing of the present invention. If embodied in software, each block may represent a module, segment or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

While the block diagrams of FIGS. 2-4 may show a specific order of execution, it will be appreciated that two or more steps in the diagrams that are shown executed in succession may be executed concurrently or with partial concurrence. In addition, any number of counters, state variables, warning semaphores, or messages might be added to the logical flow described herein, for purposes of enhanced utility, accounting, performance measurement, troubleshooting, etc. It is understood that all such variations are within the scope of the present invention. The block diagrams of FIGS. 2-4 are relatively self-explanatory and may be utilized by one of ordinary skill in the art to create software and/or hardware to carry out the various logical functions described and illustrated.

Where the method of the present invention comprises software or code, it may be embodied in any computer-readable medium for use by or in connection with an instruction execution system such as, for example, a processor in a computer system or other system. In this sense, the method of the present invention may comprise, for example, statements including instructions and declarations that may be fetched from the computer-readable medium and executed by the instruction execution system. In the context of the present invention, a "computer-readable medium" may be any medium that can contain, store or otherwise maintain the method of the present invention for use by or in connection with an instruction execution system. The computer-readable medium may comprise any one of many physical media such as, for example, electronic, magnetic, optical, electromagnetic, or semiconductor media. More specific examples of a suitable computer-readable medium would include, but are not limited to, magnetic tapes, magnetic floppy diskettes, magnetic hard drives and compact discs. Also, the computer-readable medium may be a random access memory (RAM) including, for example, static random access memory (SRAM), dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It will be appreciated that a variety of other equivalent modifications and substitutions may be made to the method of the present invention according to the concepts covered herein, depending upon the particular implementation, while still falling within the scope of the claims below.

We claim:

1. A method, comprising:
a mobile device transmitting a print request to an imaging device, the print request including a reference to content to be printed but not the content to be printed, a public key, and an address for the mobile device;
the imaging device transmitting the print request to a print service;
the print service receiving the print request from the imaging device;
in response to receiving the print request, the print service encrypting the content to be printed referenced in the print request using the public key;
the print service transmitting the encrypted content to the imaging device;
the imaging device requesting a private key corresponding to the public key from the mobile device at the address for the mobile device included in the print request;
the mobile device sending the imaging device the private key; and
the imaging device decrypting the encrypted content using the private key and printing the decrypted content.

2. The method of claim 1, wherein the print request includes a location of the content to be printed and the method further comprising the print service retrieving the content to be printed from the location included in the print request.

3. One or more non-transitory computer readable media having computer readable instructions thereon for:
a mobile device transmitting a print request to an imaging device, the print request including a reference to content to be printed but not the content to be printed, a public key, and an address for the mobile device;
the imaging device transmitting the print request to a print service;
the print service receiving the print request from the imaging device;
in response to receiving the print request, the print service encrypting the content to be printed referenced in the print request using the public key; the print service transmitting the encrypted content to the imaging device;
the imaging device requesting a private key corresponding to the public key from the mobile device at the address for the mobile device included in the print request;
the mobile device sending the imaging device the private key; and
the imaging device decrypting the encrypted content using the private key and printing the decrypted content.

4. The one or more computer readable media of claim 3, wherein the print request includes a location of the content to be printed and the instructions further comprise instructions for the print service retrieving the content to be printed from the location included in the print request.

* * * * *

UNITED STATES PATENT AND TRADEMARK OFFICE
CERTIFICATE OF CORRECTION

PATENT NO. : 8,271,776 B2
APPLICATION NO. : 09/970496
DATED : September 18, 2012
INVENTOR(S) : Daniel Revel et al.

Page 1 of 1

It is certified that error appears in the above-identified patent and that said Letters Patent is hereby corrected as shown below:

In column 3, line 3, after "generate" delete "enepotien".

In column 3, line 40, after "transmit the" delete "first".

Signed and Sealed this
Ninth Day of April, 2013

Teresa Stanek Rea
*Acting Director of the United States Patent and Trademark Office*